Patented Dec. 15, 1953

2,662,879

UNITED STATES PATENT OFFICE 2,662,879

SEPARATION OF GEOMETRICAL ISOMERS BY UREA COMPLEX FORMATION

Richard A. Foster and Charles G. Laspe, Long Beach, Calif., assignors to Shell Development Company, San Francisco, Calif., a corporation of Delaware No Drawing. Application January 29, 1949, Serial No. 73,656

6 Claims. (Cl. 260—96.5)

This invention relates to the fractionation of certain mixtures of organic compounds. More particularly, it is concerned with the fractionation of mixtures of cis-trans stereoisomers. The separation of mixtures of organic compounds is usually effected by such commonly known procedures as fractional distillation, fractional crystallization or solvent extraction methods, including extractive distillation. For many purposes and with numerous mixtures, these methods are quite adequate; however, they do not perform satisfactorily for the separation of certain mixtures, such as mixtures of geometric stereoisomeric pairs of straight chain organic compounds, as more fully defined hereinafter. The separation of cis and trans stereoisomers is desirable for the production of preferred materials for particular purposes.

It is an object of this invention to provide a method for the separation of cis and trans isomers. It is another object of this invention to provide a method for the separation of a mixture of stereoisomers into two fractions, the trans isomers being concentrated in one fraction and the cis isomers being concentrated in another. Other objects will become apparent during the following discussion.

Now, in accordance with this invention, a method has been found for the separation of liquid straight chain geometric stereoisomers into two fractions, having the cis isomers concentrated in one fraction and the trans isomers concentrated in another. The method comprises treatment of such mixtures with urea to form crystalline molecular complexes between urea and a part of the mixture; separating the crystalline complexes from the remaining liquid unreacted components of the mixture; and regenerating the components present in the crystalline complexes. It has been found, in accordance with this invention, that the trans isomers concentrate in the fraction forming urea complexes, while the cis isomers concentrate in the liquid unreacted fraction.

Stereoisomerism, and particularly geometrical stereoisomerism, is a phenomenon which is well understood and fully defined in numerous standard texts, such as "Fatty Acids" by Markley, published in 1947 by the Interscience Publishers, Incorporated; chapter three is especially pertinent. The term "liquid" is meant to include stereoisomers which are normally liquid at about room temperature as well as liquid compositions containing either liquid or dissolved stereoisomers. An example of the latter type would be a solution of the stereoisomers which flows at room temperature and from which the stereoisomers do not precipitate at room temperature. The term "straight chain geomertic stereoismers" is means to include stereoisomeric pairs of straight chain organic compounds, including olefin hydrocarbons, unsaturated fatty acids and derivatives of such acids, such as esters, amides, alcohols and nitriles. The qualification that the stereoisomers should be "straight chain" materials is meant to specify organic compounds derivable from unbranched olefin hydrocarbons which contain an unbranched hydrocarbon chain having only hydrogen substituents except for variation in a terminal group. The terminal group may be preferably a carboxyl group or a derivative thereof, such as an ester, hydroxyl, amino, amido or nitrile radical. The unbranched hydrocarbon chain should have at least about four carbon atoms and must contain at least one olefinic carbon-to-carbon double bond, thus permitting geometric isomerism according to the standard conception of the term, as defined by Markley, referred to above. Geomertic isomerism is still further treated by Gilman in "Organic Chemistry," volume I, page 444, published by John Wiley and Sons, 1943 edition.

The method has been found to be especially effective when at least one part of one stereoisomer is present in the mixture, together with nine parts of the corresponding stereoisomer; hence, the preferred mixtures exhibiting optimum response to the method of the present invention comprise 10–90 parts each of stereoisomeric pairs of compounds as defined above. While the method has been found to be most effective for the separation of stereoisomeric pairs such as oleic from elaidic acid, the method is also applicable to the separation of other straight chain isomers having a cis configuration from straight chain materials having a trans configuration.

The reaction of urea with straight chain hydrocarbons and oxygen containing materials is known, and the use of this phenomenon for the separation of straight chain materials from branched chain materials has been proposed. However, up to the present time, the extent of formation of crystalline molecular complexes between urea and trans stereoisomers as compared to the extent of formation with cis stereoisomers has not been realized. Hence, the invention particularly comprises the utilization of this newly discovered phenomenon for the separation of mixtures of the specified stereoisomers.

The process is especially applicable to the separation of fatty acid stereoisomers, such as oleic from elaidic acids or linolenic from elaido-linolenic acids. These examples are typical stereoisomeric straight chain fatty acids falling within the preferred range of materials to which the process applies, since they contain at least ten carbon atoms in the straight chain portion of the molecule. The formation of crystalline molecular complexes with urea has been observed in straight chain materials having up to as many as about forty carbon atoms. While this is the highest limit which has been tested, there is no reason to assume that it would not also apply to straight chains of greater length.

The process applies, as indicated above, to straight chain olefinic hydrocarbons having polar terminal groups, especially a fatty unsaturated acid or derivative. In addition to the fatty acids, the application of the present process to the fractionation of esters thereof with monohydric alcohols is especially promising. Preferably, the alcohol has from one to ten carbon atoms, the resulting stereoisomers being those such as methyl oleate and methyl elaidate.

Other stereoisomeric mixtures which may be separated according to the present process include the stereoisomers of unsaturated amides meeting the structural configurations given above and include, for example, linoleyl amide and linoleaidyl amide.

Since the alcohols corresponding to straight chain unsaturated fatty acids exist as stereoisomers, it is possible to apply the present process to the separation of such mixtures as the stereoisomeric fatty alcohols, such as oleyl alcohol and elaidyl alcohol. The process of the present invention is especially valuable for the fractionation of mixtures obtained by the hydrolysis of vegetable oil glycerides and from such synthetic mixtures as those obtained in the Fischer-Tropsch synthesis. In the latter case, a complex mixture of acids, aldehydes, ketones and alcohols results, from which it is sometimes desirable to separate the cis and trans isomers which may be present. Nitriles respond to the treatment, such as the unsaturated nitriles having one olefinic double bond and containing eighteen carbon atoms in the hydrocarbon chain.

The formation of crystalline molecular complexes between terminally polar substituted unsaturated straight chain hydrocarbons and their derivatives with urea is believed to take place by the formation of a helical structure of urea surrounding the straight hydrocarbon chain of the contained molecule. It has been determined that approximately one molecule of urea is present for every carbon atom in the hydrocarbon chain. This ratio decreases slightly as the molecular weight of the straight chain compound increases. The reason for preferential formation of molecular complexes between urea and the trans isomers, such as those specified above, in preference to the cis isomers is not fully understood.

The crystalline complexes prepared according to the process of the present invention decompose upon contact with a solvent for urea or with a solvent for the contained organic compound held in complex formation with urea. Decomposition under these circumstances will occur only above a definite decomposition temperature, which in most cases is within the range 75°-100° C., especially when water is the decomposing medium employed. Under some conditions when decomposing molecular complexes of low molecular weight materials, decomposition temperatures as low as about 0° C. are sometimes sufficient. Aqueous media, such as dilute urea solution, are also effective for this purpose and may be utilized for the simultaneous regeneration of the contained organic compound and the reconcentration of depleted urea solutions.

The process of this invention comprises mixing a solution of urea with the stereoisomers at a temperature which ordinarily should be between 0° and 75° C. The urea solution is preferably concentrated, and the temperature of reaction is preferably controlled so as to maintain the urea solution at its saturation point at all times during the process. However, more dilute solutions of urea may be employed for the purpose of selectively extracting particular members from the mixture. This is based upon the observation that each specific compound will form crystalline molecular complexes with urea only under a limited set of conditions. For example, if two pairs of stereoisomers are present in a mixture and it is desired to separate the trans isomers of the pair having the highest molecular weight, a solution of urea is employed for the purpose at a temperature above that at which complexes will be formed with the stereoisomers having the lowest molecular weight. All other factors being equal, the maximum temperatures at which complexes may be formed increase as the molecular weight of the straight chain compound is raised.

As indicated hereinbefore, the mixture of geometrical stereoisomers may be employed without modification in the process if they are liquid at the temperature of complex formation. Preferably, however, they are dissolved in solvents which have been found to favor such formation under the conditions described above. Solvents which are especially useful in the present process include especially low molecular weight ketones, such as methyl ethyl ketone and especially methyl isobutyl ketone. Alcohols, such as methyl, ethyl, isopropyl, isobutyl or isoamyl alcohols, may be employed in place of or in addition to other solvents if desired.

Treatment with urea is carried out only so far as to form complexes with a fraction of the original mixture of stereoisomers. It is realized that if the process were carried out to its ultimate extent, substantially all of such mixtures containing only straight chain organic compounds would eventually form crystalline molecular complexes with urea. However, since fractionation is desired in the present instance, the treatment with urea should be so regulated in regard to time, temperature and ratio of urea to stereoisomers that only a desired fraction of the latter forms crystalline urea complexes. It will be found in almost every case that both the extract and the raffinate contain both members of a given pair of stereoisomers but that the trans isomers are concentrated in the extract, while the cis isomers are concentrated in the raffinate. By recycling the separated fractions for additional urea treatment a greater degree of fractionation may be accomplished. By "extract" is meant the fraction of the stereoisomeric mixture forming urea complexes under the conditions employed. The term "raffinate" is meant to include the liquid unreacted fraction of the original mixture which remains after extraction with urea. The examples given below illustrate the process of the present invention.

Example I

Seventy-five parts of a mixture containing twenty-five parts elaidic acid and fifty parts oleic acid were shaken at room temperature for two hours with 600 parts of a methyl alcoholic solution of urea which was originally saturated at 27° C. The crystalline molecular complexes obtained by this treatment were filtered away from the remaining liquid unreacted fraction of the mixture and were washed with a saturated methyl alcoholic solution of urea. The complexes were then decomposed by heating in water at about 80° C. The fatty acids so recovered were tested by infra-red absorption. The liquid unreacted raffinate also was tested by the same method. It was found that the extracted fatty acids recovered from the crystalline complexes were composed of about 51% elaidic acid, while the raffinate acids contained only about 30% elaidic acid.

Example II

The raffinate acids obtained as described in Example I were subjected to a second treatment with urea as described above. The extracted acids so obtained were found by infra-red absorption inspection to contain about 51% elaidic acid, while the liquid raffinate fraction contained only 27% elaidic acid.

Example III

Fifty-five parts of a mixture containing 19% elaidic acid and 81% oleic acid were dissolved in sixty parts of methyl isobutyl ketone. The diluted mixture was shaken with 300 parts of an aqueous urea solution, which was originally saturated at 32° C. The temperature of the reaction vessel was reduced step-wise during the course of the reaction to a final value of 21° C. It was found that the acids so extracted and recovered, as described above, contained 28% elaidic acid, while the unrecated raffinate contained about 12% elaidic acid.

The invention claimed is:

1. The process which comprises contacting 600 parts of a methyl alcoholic solution of urea saturated at 27° C. with a mixture of 25 parts elaidic acid and 75 parts oleic acid at about room temperature and separating crystalline complexes of urea with both oleic acid and elaidic acid, said complexes being relatively enriched in elaidic acid, from the unreacted portion of the original mixture, said unreacted portion being relatively enriched in oleic acid.

2. The process which comprises contacting 300 parts of an aqueous urea solution saturated at 32° C. with 15.45 parts elaidic acid, 39.55 parts oleic acid and 60 parts of methyl isobutyl ketone at a temperature between 21 and 32° C. and separating the crystalline complexes of urea with both elaidic acid and oleic acid so formed, said complexes being relatively enriched in elaidic acid from the unreacted portion of the original mixture, said unreacted portion being relatively enriched in oleic acid.

3. A process for the fractionation of a liquid mixture of cis and trans isomers of a terminally polar substituted straight-chain unsaturated hydrocarbon compound having at least 10 carbon atoms in the unsaturated hydrocarbon chain thereof, which comprises contacting said mixture with urea at a temperature between 0° C. and 75° C. whereby crystalline molecular complexes of urea are formed with a substantial portion of said mixture and separating the crystalline complexes from the liquid unreacted portion of the orginal mixture, the complexes being relatively enriched in the trans isomer and said unreacted portion being relatively enriched in the cis isomer.

4. A process for the fractionation of a liquid mixture of cis and trans isomers of an unsaturated straight-chain fatty acid having at least 10 carbon atoms per molecule which comprises contacting said mixture with urea at a temperature of between 0° C. and 75° C. whereby crystalline molecular complexes of urea are formed with a substantial portion of said mixture and separating the crystalline complexes from the liquid unreacted portion of the original mixture, the complexes being relatively enriched in the trans isomer and said unreacted portion being relatively enriched in the cis isomer.

5. A process for the fractionation of a liquid mixture of cis and trans isomers of an unsaturated straight-chain fatty acid having at least 10 carbon atoms per molecule which comprises contacting said mixture with an alcoholic solution of urea at a temperature of between 0° C. and 75° C. whereby crystalline molecular complexes of urea are formed with a substantial portion of said mixture and separating the crystalline complexes from the liquid unreacted portion of the original mixture, the complexes being relatively enriched in the trans isomer and said unreacted portion being relatively enriched in the cis isomer.

6. A process for the fractionation of a lower aliphatic ketone solution of a mixture of cis and trans isomers of an unsaturated straight-chain fatty acid having at least 10 carbon atoms per molecule which comprises contacting said mixture with urea at a temperature of between 0° C. and 75° C., whereby crystalline molecular complexes of urea are formed with a substantial portion of said mixture and separating the crystalline complexes from the liquid unreacted portion of the original mixture, the complexes being relatively enriched in the trans isomer and said unreacted portion being relatively enriched in the cis isomer.

RICHARD A. FOSTER.
CHARLES G. LASPE.

References Cited in the file of this patent

UNITED STATES PATENTS

| Number | Name | Date |
|---|---|---|
| 2,518,677 | Garner et al. | Aug. 15, 1950 |

OTHER REFERENCES

E. Bengen, Reel 143, Technical Oil Mission, pages 135 to 139, included in Index released May 31, 1946, Bureau of Mines Index of Tech. Oil Mission (sent to Shell Oil Co. for translation after May 22, 1946).

Schlenk et al., "Science," 112 (July 7, 1950), pages 19 and 20.